United States Patent
Wang et al.

(10) Patent No.: US 10,638,101 B2
(45) Date of Patent: Apr. 28, 2020

(54) PROJECTION SYSTEM AND CONTROL METHOD

(71) Applicant: APPOTRONICS CORPORATION LIMITED, Shenzhen (CN)

(72) Inventors: Zeqing Wang, Shenzhen (CN); Zuqiang Guo, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 0 days.

(21) Appl. No.: 15/539,052

(22) PCT Filed: Jan. 28, 2016

(86) PCT No.: PCT/CN2016/072433
§ 371 (c)(1),
(2) Date: Jun. 22, 2017

(87) PCT Pub. No.: WO2016/127814
PCT Pub. Date: Aug. 18, 2016

(65) Prior Publication Data
US 2017/0353702 A1 Dec. 7, 2017

(30) Foreign Application Priority Data
Feb. 15, 2015 (CN) .......................... 2015 1 0082870

(51) Int. Cl.
*H04N 9/31* (2006.01)
*G03B 21/14* (2006.01)
(Continued)

(52) U.S. Cl.
CPC ........... *H04N 9/3155* (2013.01); *G03B 21/14* (2013.01); *G03B 21/204* (2013.01);
(Continued)

(58) Field of Classification Search
CPC ................................................... H04N 1/40068
(Continued)

(56) References Cited

U.S. PATENT DOCUMENTS

| 6,334,685 B1 * | 1/2002 | Slobodin | H04N 9/3117 348/E9.027 |
| 2002/0118375 A1 * | 8/2002 | Ramanujan | B41J 2/465 358/1.2 |

(Continued)

FOREIGN PATENT DOCUMENTS

| CN | 2935207 Y | 8/2007 |
| JP | 2007078866 A | 3/2007 |
| JP | 2007310095 A | 11/2007 |

OTHER PUBLICATIONS

The World Intellectual Property Organization (WIPO) International Search Report for PCT/CN2016/072433 dated Apr. 28, 2016 6 Pages.

*Primary Examiner* — Jefferey F Harold
*Assistant Examiner* — Sihar A Karwan
(74) *Attorney, Agent, or Firm* — Anova Law Group, PLLC

(57) ABSTRACT

The present disclosure provides a projection system and a control method thereof, comprising: a light source system, configured to sequentially generate primary light of three colors; a light modulation system comprising at least one light modulator configured to module the primary light; and a control system, configured to: divide time duration of each primary light in each source image frame into a plurality of modulation periods according to the number of gray scales, sequentially arrange the modulation periods, wherein at least two modulation periods of at least one primary light are arranged with an interval, and control the light source system to generate the primary light of the corresponding color in each modulation period according to a sequence of (Continued)

the modulation periods, and control the at least one light modulator to modulate the primary light of the corresponding color.

4 Claims, 3 Drawing Sheets

(51) Int. Cl.
*G03B 21/20* (2006.01)
*G03B 33/08* (2006.01)

(52) U.S. Cl.
CPC ......... *G03B 21/2073* (2013.01); *G03B 33/08* (2013.01); *H04N 9/31* (2013.01); *H04N 9/3111* (2013.01); *H04N 9/3117* (2013.01); *H04N 9/3164* (2013.01)

(58) Field of Classification Search
USPC .............................. 348/744, 762; 353/20, 84
See application file for complete search history.

(56) References Cited

U.S. PATENT DOCUMENTS

| | | | |
|---|---|---|---|
| 2007/0195207 A1* | 8/2007 | Wang | H04N 9/3114 348/744 |
| 2009/0180039 A1 | 7/2009 | Taro et al. | |
| 2009/0201418 A1 | 8/2009 | Taro et al. | |
| 2010/0073568 A1* | 3/2010 | Van Ostrand | H04N 9/3111 348/578 |

* cited by examiner

PROJECTION SYSTEM AND CONTROL METHOD

CROSS-REFERENCES TO RELATED APPLICATIONS

This application is a national stage patent application of PCT application No. PCT/CN2016/072433, filed on Jan. 28, 2016, which claims priority to Chinese Patent Application No. 201510082870.2, filed on Feb. 15, 2015, the entire content of all of which is incorporated herein by reference.

FIELD OF THE INVENTION

The present disclosure relates to the technical field of projector technology, and more specifically, relates to a projection system and a control method thereof.

BACKGROUND

As shown in FIG. 1, a conventional projection system includes a solid-state light source 101, a rotary color wheel 102, a light-uniforming device 103, a spatial light modulator 104, and a projection lens 105. In particular, the solid-state light source 101 often adopts a blue light source, the rotary color wheel 102 at least includes a first region having a red phosphor R, a second region having a green phosphor G, and a third region having a blue phosphor B. When the rotary color wheel 102 is rotated around a shaft 1020, the blue light emitted by the solid-state light source 101 is incident onto different regions having different phosphors, exciting primary light of red color, primary light of green color, and primary light of blue color in a sequence of time. The primary light of red, green and blue color is mixed by the light-uniforming device 103 and modulated by the spatial light modulator 104, then project onto a screen 106 through the projection lens 105.

Currently, conventional spatial light modulators, such as Digital Micro mirror devices (DMD), often modulate the gray scale of images in a binary mode. For example, given the number of the gray scales is four, after the light source sequentially generates primary light of red color, green color, and blue color, the DMD divides the time duration of each primary light into four periods. For example, the time duration of the red primary light is divided into R1, R2, R3 and R4, the time duration of the green primary light is divided into G1, G2, G3 and G4, and the time duration of the blue primary light is divided into B1, B2, B3 and B4. The sequence of modulation periods is shown in FIG. 2. The four periods of the red primary light are modulated first, after which the four periods of the green primary light and the four periods of the blue primary light are modulated. In particular, the time duration of each period of the red primary light satisfies $T_{R4}2^0=T_{R3}2^1=T_{R2}2^2=T_{R1}2^3$, the time duration of each period of the green primary light satisfies $T_{G4}2^0=T_{G3}2^1=T_{G2}2^2=T_{G1}2^3$, and the time duration of each period of the blue primary light satisfies $T_{B4}2^0=T_{B3}2^1=T_{B2}2^2=T_{B1}2^3$.

In the above-mentioned projection system, the red, green, and blue primary light is generated by rotating the rotary color wheel. That is, the switching speed of the primary light of different colors depends on the rotational speed of the rotary color wheel, which results a substantially low switching speed of the primary light of different colors. Accordingly, the projected images may be subjected to a rainbow effect, degrading the quality of the projected images.

BRIEF SUMMARY OF THE DISCLOSURE

In view of this, the present disclosure provides a projection system and a control method thereof, which are directed to resolve the image quality degradation caused by the rainbow effect in the conventional projection systems.

To achieve the above purposes, the present disclosure provides the following technical solutions:

A projection system, comprising:
  a light source system, configured to sequentially generate primary light of three colors;
  a light modulation system comprising at least one light modulator configured to module the primary light; and
  a control system, configured divide time duration of each primary light in each source image frame into a plurality of modulation periods according to the number of gray scales, sequentially arrange the modulation periods, wherein at least two modulation periods of at least one primary light are arranged with an interval, control the light source system to generate the primary light of the corresponding color in each modulation period according to a sequence of the modulation periods, and control the at least one light modulator to modulate the primary light of the corresponding color.

Optionally, when the primary light of three colors includes first, second and third primary light, the control system is further configured to:
  sequentially arrange the modulation periods, wherein at least one of any one of the modulation periods of the second primary light and any one of the modulation periods of the third primary light is arranged between any two modulation periods of the first primary light, and the any one of the modulation periods of the second primary light and the any one of the modulation periods of the third primary light are sequentially arranged.

Optionally, when each of the first primary light, the second primary light, and the third primary light includes the $1^{st}$ modulation period to the $N^{th}$ modulation period, the control system is further configured to:
  sequentially arrange the modulation periods, wherein: the $1^{st}$ modulation period of the second primary light and the $1^{st}$ modulation period of the third primary light are sequentially arranged between the $1^{st}$ modulation period and the $2^{nd}$ modulation period of the first primary light; the $2^{nd}$ modulation period of the second primary light and the $2^{nd}$ modulation period of the third primary light are sequentially arranged between the $2^{nd}$ modulation period and the $3^{rd}$ modulation period of the first primary light, and so on; and the $(N-1)^{th}$ modulation period of the second primary light and the $(N-1)^{th}$ modulation period of the third primary light are sequentially arranged between the $(N-1)^{th}$ modulation period and the $N^{th}$ modulation period of the first primary light, where N is a natural number greater than 1.

Optionally, the light source system comprises a first adjustable light source, a second adjustable light source and a third adjustable light source,
  wherein the first adjustable light source emits the first primary light;
  the second adjustable light source emits the second primary light; and
  the third adjustable light source emits the third primary light.

Optionally, according to the sequence of the modulation periods, the control system is further configured to control the corresponding adjustable light source to be turned on and other adjustable light sources to be turned off, thereby generating the primary light of the corresponding color in each modulation period.

Optionally, the light source system comprises an excitation light source, a light-switching device, a first color wheel, a second color wheel and a third color wheel,
wherein the excitation light source emits excitation light, and
the light-switching device switches the excitation light to be incident onto the first color wheel, the second color wheel or the third color wheel to generate the first primary light, the second primary light or the third primary light.

Optionally, according to the sequence of the modulation periods, the control system is further configured to control the light-switching device to switch the excitation light to be incident onto the corresponding color wheel, thereby generating the primary light of the corresponding color in each modulation period.

Optionally, the projection system further comprises a first filter, a second filter, and a third filter,
wherein the first filter is disposed on a light exit surface of the first color wheel for transmitting the first primary light while blocking other light,
the second filter is disposed on a light exit surface of the second color wheel for transmitting the second primary light while blocking other light, and
the third filter is disposed on a light exit surface of the third color wheel for transmitting the third primary light while blocking other light.

Optionally, the light source system comprises an excitation light source, a first polarization converter, a second polarization converter, a first beam splitter, a second beam splitter, a reflective mirror, a first color wheel, a second color wheel and a third color wheel,
wherein the excitation light source emits excitation light, which is first polarized light,
the first polarization converter converts the first polarized light to second polarized light or directly transmits the first polarized light, wherein polarization directions of the first and second polarized light are perpendicular to each other,
the first beam splitter transmits the first polarized light, and reflects the second polarized light onto the first color wheel to generate the first primary light,
the second polarization converter coverts the first polarized light to the second polarized light or directly transmits the first polarized light,
the second beam splitter transmits the first polarized light, and reflects the second polarized light onto the second color wheel to generate the second primary light,
the reflective mirror reflects the first polarized light onto the third color wheel to generate the third primary light.

Optionally, according to the sequence of the modulation periods, the control system is further configured to control the corresponding polarization converter to convert or transmit, thereby generating the primary light of the corresponding color in each modulation period.

Optionally, the projection system further comprises a first analyzer, a second analyzer and a third analyzer,
wherein the first analyzer is disposed between the first beam splitter and the first color wheel, for transmitting the second polarized light while blocking other light,
the second analyzer is disposed between the second beam splitter and the second color wheel, for transmitting the second polarized light while blocking other light; and
the third analyzer is disposed between the reflective mirror and the third color wheel, for transmitting the first polarized light while blocking other light.

Optionally, the projection system further comprises a light-combining system disposed between the color wheel and the light modulator,
wherein the light-combining system comprises a reflective mirror, a first dichroic mirror, and a second dichroic mirror,
the reflective mirror reflects the first primary light to the first dichroic mirror,
the first dichroic mirror transmits the first light, and reflects the second primary light to the second dichroic mirror, and
the second dichroic mirror reflects the first primary light and the second primary light, and transmits the third primary light, or transmits the first primary light and the second primary light, and reflects the third primary light.

Optionally, the first color wheel comprises a red phosphor, the second color wheel comprises a green phosphor, and the third color wheel comprises a blue phosphor or a scattering powder.

A control method for controlling any one of the above disclosed projection systems, comprising:
according to the number of gray scales, dividing time duration of each primary light in each source image frame into a plurality of modulation periods;
sequentially arranging the modulation periods, wherein at least two modulation periods of at least one primary light are arranged with an interval; and
according to a sequence of the modulation periods, controlling the light source system to generate the primary light of the corresponding color in each modulation period, and controlling the light modulator to modulate the primary light of the corresponding color.

Optionally, when the primary light of three colors includes first, second and third primary light, sequentially arranging the modulation periods, wherein at least two modulation periods of at least one primary light are arranged with an interval, further includes:
sequentially arranging at least one of any one of the modulation periods of the second primary light and any one of the modulation periods of the third primary light between any two modulation periods of the first primary light, wherein the any one of the modulation periods of the second primary light and the any one of the modulation periods of the third primary light are sequentially arranged.

Optionally, when each of the first primary light, the second primary light, and the third primary light includes the $1^{st}$ modulation period to the $N^{th}$ modulation period, sequentially arranging the modulation periods, wherein at least two modulation periods of at least one primary light are arranged with an interval, further includes:
sequentially arranging the $1^{st}$ modulation period of the second primary light and the $1^{st}$ modulation period of the third primary light between the $1^{st}$ modulation period and the $2^{nd}$ modulation period of the first primary light;
sequentially arranging the $2^{nd}$ modulation period of the second primary light and the $2^{nd}$ modulation period of the third primary light between the $2^{nd}$ modulation period and the $3^{rd}$ modulation period of the first primary light, and so on; and
sequentially arranging the $(N-1)^{th}$ modulation period of the second primary light and the $(N-1)^{th}$ modulation period of the third primary light between the $(N-1)^{th}$ modulation period and the $N^{th}$ modulation period of the first primary light, where N is a natural number greater than 1.

Optionally, when the light source system comprises a first adjustable light source, a second adjustable light source and a third adjustable light source, controlling the light source system to generate the primary light of the corresponding color in each modulation period further includes:

according to the sequence of the modulation periods, controlling the corresponding adjustable light source to be turned on and other adjustable light sources to be turned off, thereby generating the primary light of the corresponding color in each modulation period.

Optionally, when the light source system comprises an excitation light source, a light-switching device, a first color wheel, a second color wheel and a third color wheel, controlling the light source system to generate the primary light of the corresponding color in each modulation period further includes:

according to the sequence of the modulation periods, controlling the light-switching device to switch the excitation light to be incident onto the corresponding color wheel, thereby generating the primary light of the corresponding color in each modulation period.

Optionally, when the light source system comprises an excitation light source, a first polarization converter, a second polarization converter, a first beam splitter, a second beam splitter, a reflective mirror, a first color wheel, a second color wheel and a third color wheel, controlling the light source system to generate the primary light of the corresponding color in each modulation period further includes:

according to the sequence of the modulation periods, controlling the corresponding polarization converter to convert or transmit, thereby generating the primary light of the corresponding color in each modulation period.

Compared with the prior art, the technical solutions provided by the invention has the following advantages:

The projection system and the control method thereof provided by the present disclosure may divide the time duration of each primary light in each source image frame into a plurality of modulation periods according to the number of the gray scales; sequentially arrange the modulation periods, where at least two modulation periods of at least one primary light are arranged with an interval; according to the sequence of the modulation periods, control the light source system to generate the primary light of the corresponding color in each modulation period; and control the light modulator to modulate the primary light of the corresponding color. Thus, when at least two modulation periods of at least one primary light are arranged with an interval, one modulation period of one primary light may be modulated first, and then one modulation period of another primary light may be modulated. As compared with the conventional technique in which all the modulation periods of one primary light are modulated first, and then all the modulation periods of another primary color light are modulated, the switching speed of the primary light of different colors may be greatly improved, thereby significantly reducing the influence of the rainbow effect on the quality of the projected images.

BRIEF DESCRIPTION OF THE DRAWINGS

To describe the technical solutions of the embodiments of the present disclosure more clearly, the accompanying drawings used in the description of the embodiments will be briefly introduced below. Apparently, the drawings for the description below illustrate merely some embodiments of the disclosure, and other figures can be derived from the accompanying drawings by those ordinary skilled in the art without creative work.

DETAILED DESCRIPTION

Figure 1:
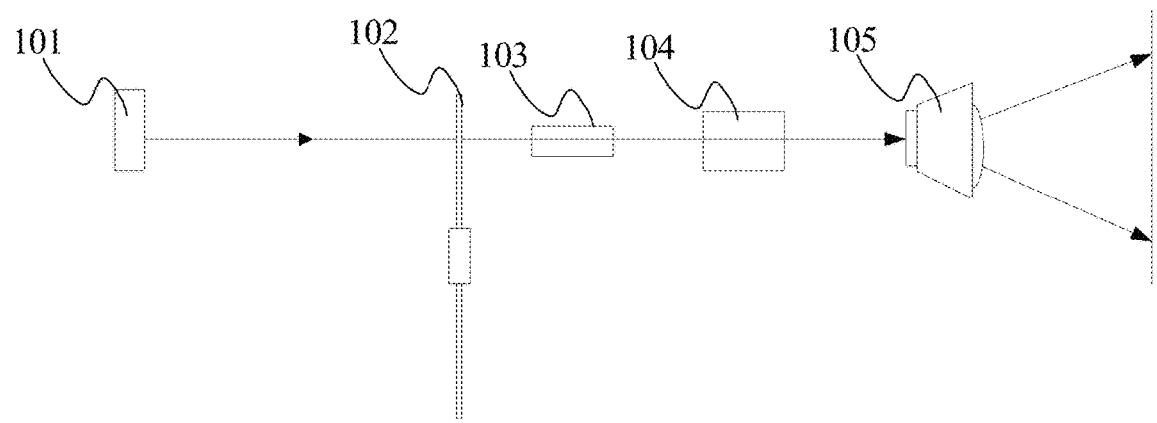
FIG. 1 illustrates a schematic diagram of a conventional projection system.
Figure 2:
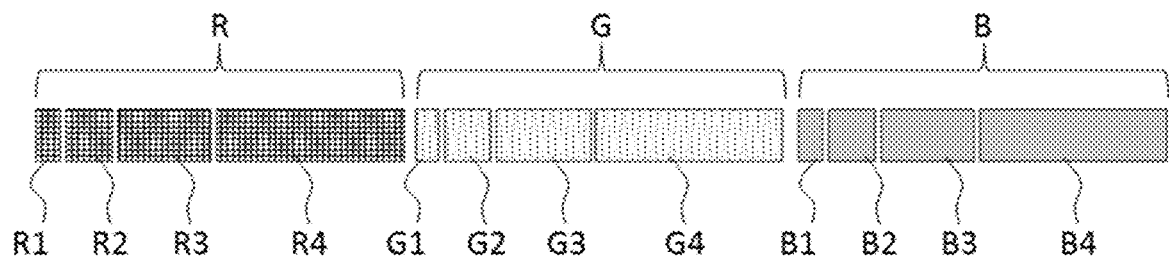
FIG. 2 illustrates a sequence diagram of modulation periods of a conventional projection system.

The technical solutions in embodiments of the present disclosure will be clearly and thoroughly described with reference to the accompanying drawings illustrating the embodiments of the present disclosure. Apparently, the described embodiments are merely a part rather than all of embodiments of the present disclosure. Any other embodiment obtained by persons of ordinary skill in the art based on the described embodiments of the present disclosure without creative work shall fall in the protection scope of the present disclosure.

First Embodiment

The disclosed embodiment provides a projection system comprising a light source system, a light modulation system and a control system. The light source system is configured to sequentially generate primary light of three colors. The light modulation system comprises at least one light modulator, which is configured to module the primary light. The control system is configured to divide the time duration of each primary light in each source image frame into a plurality of modulation periods according to the number of the gray scales; sequentially arrange the modulation periods, wherein at least two modulation periods of at least one primary light are arranged with an interval; according to the sequence of the modulation periods, control the light source system to generate the primary light of the corresponding color in each modulation period, and control the light modulator to modulate the primary light of the corresponding color.

In particular, when the primary light of three colors includes first, second and third primary light, when arranging at least two modulation periods of at least one primary light with an interval, at least one of any one of the modulation periods of the second primary light and any one of the modulation periods of the third primary light is arranged between any two modulation periods of the first primary light, in which the any one of the modulation periods of the second primary light and the any one of the modulation periods of the third primary light are sequentially arranged.

Further, provided that each of the first primary light, the second primary light, and the third primary light includes the $1^{st}$ modulation period to the $N^{th}$ modulation period, when arranging at least one of any one of the modulation periods of the second primary light and any one of the modulation periods of the third primary light between any two modulation periods of the first primary light, the $1^{st}$ modulation period of the second primary light and the $1^{st}$ modulation period of the third primary light are sequentially arranged between the $1^{st}$ modulation period and the $2^{nd}$ modulation period of the first primary light; the $2^{nd}$ modulation period of the second primary light and the $2^{nd}$ modulation period of the third primary light are sequentially arranged between the $2^{nd}$ modulation period and the $3^{rd}$ modulation period of the first primary light, and so on; and the $(N-1)^{th}$ modulation period of the second primary light and the $(N-1)^{th}$ modulation period of the third primary light are sequentially arranged between the $(N-1)^{th}$ modulation period and the $N^{th}$ modulation period of the first primary light, where N is a natural number greater than 1.

Figure 3:
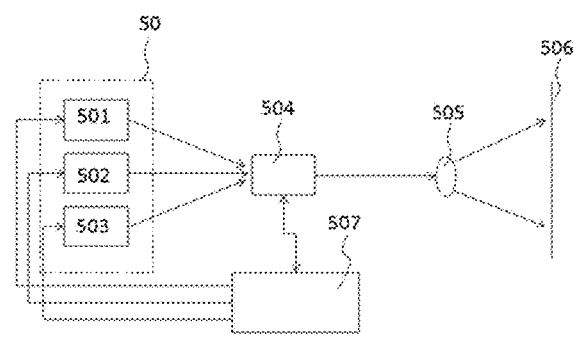
FIG. 3 illustrates a schematic diagram of an exemplary projection system according to a first embodiment.

As shown in FIG. 3, the light source system may comprise a first adjustable light source 501, a second adjustable light source 502, and a third adjustable light source 503. The first adjustable light source 501 may emit the first primary light such as red light R, the second adjustable light source 502 may emit the second primary light such as green light G, and the third adjustable light source 503 may emit the third primary light such as blue light B. The light modulation system may comprise a light modulator 504. The control system 507 may control the corresponding adjustable light source to be turned on and the other adjustable light sources to be turned off in accordance with the sequence of the modulation periods, to generate the primary light of the corresponding color in each modulation period.

Figure 4:
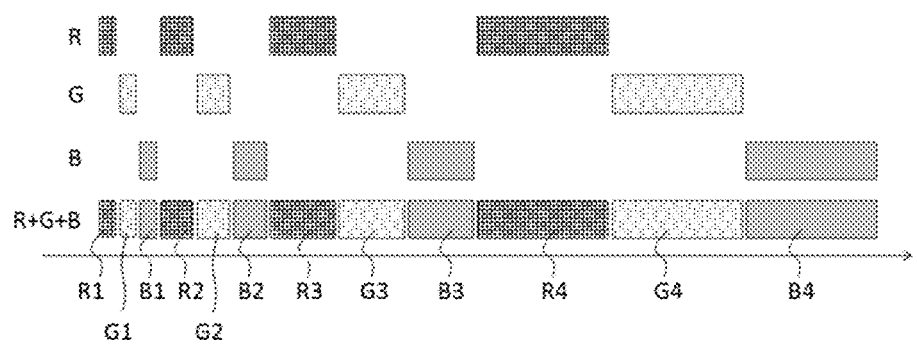
FIG. 4 illustrates an exemplary sequence diagram of modulation periods consistent with disclosed embodiments.

For example, when the $(N-1)^{th}$ modulation period of the second primary light G and the $(N-1)^{th}$ modulation period of the third primary light B are sequentially arranged between the $(N-1)^{th}$ modulation period and the $N^{th}$ modulation period of the first primary light R, and the number of the gray scales is four, as shown in FIG. 4, the modulation periods may be sequentially arranged as the $1^{st}$ modulation period R1 of the first primary light (i.e., red light), the $1^{st}$ modulation period G1 of the second primary light (i.e., green light), the $1^{st}$ modulation period B1 of the third primary light (i.e., blue light), the $2^{nd}$ modulation period R2 of the first primary light (i.e., red light) . . . and the $4^{th}$ modulation period B4 of the third primary light (i.e., blue light).

According to the sequence of the modulation periods shown in FIG. 4, during the $1^{st}$ modulation period R1 of the red light, the control system 507 may turn on the first adjustable light source 501 and, meanwhile, turn off the second adjustable light source 502 and the third adjustable light source 503; during the $1^{st}$ modulation period G1 of the green light, the control system 507 may turn on the second adjustable light source 502 and, meanwhile, turn off the first adjustable light source 501 and the third adjustable light source 503; during the $1^{st}$ modulation period B1 of the blue light, the control system 507 may turn on the third adjustable light source 503 and, meanwhile, turn off the first adjustable light source 501 and the second adjustable light source 502 during the $1^{st}$ modulation period B1 of the blue light; and so on.

Meanwhile, the control system 507 may control the light modulator 504 to perform the first-gray scale modulation on the red light in the $1^{st}$ modulation period R1 of the red light, control the light modulator 504 to perform the first-gray scale modulation on the green light in the $1^{st}$ modulation period G1 of the green light, control the light modulator 504 to perform the first-gray scale modulation on the blue light in the $1^{st}$ modulation period B1 of the blue light, and so on. After being modulated by the light modulator 504, the red light, the green light and the blue light may be mixed into one light, which is going to be projected by the projection lens 505.

Figure 5:
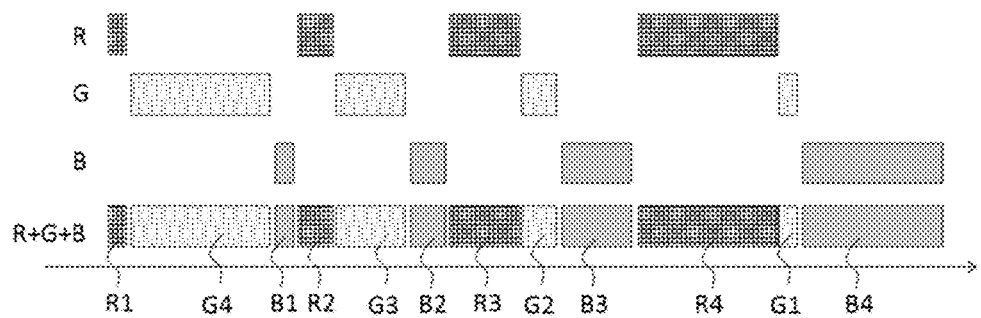
FIG. 5 illustrates another exemplary sequence diagram of modulation periods consistent with disclosed embodiments.

However, the disclosed embodiments are not intended to limit the scope of the present disclosure. In another embodiment, given the number of the gray scales is four, as shown in FIG. 5, the modulation periods may be sequentially arranged as the $1^{st}$ modulation period R1 of the red light, the $4^{th}$ modulation period G4 of the green light, the $1^{st}$ modulation period B1 of the blue light, the $2^{nd}$ modulation period R2 of the red light, the $3^{rd}$ modulation period G3 of the green light, the $2^{nd}$ modulation period B2 of the blue light, the $3^{rd}$ modulation period R3 of the red light, the $2^{nd}$ modulation period G2 of the green light, the $3^{rd}$ modulation period B3 of the blue light, the $4^{th}$ modulation period R4 of the red light, the $1^{st}$ modulation period G1 of the green light, the $4^{th}$ modulation period B4 of the blue light. The sequence of the modulation periods may be arranged according to practical applications, which is not going to be explained one by one in the present disclosure.

In the disclosed embodiment, the projection system may divide the time duration of each primary light in each source image frame into a plurality of modulation periods according to the number of the gray scales; sequentially arrange the modulation periods, where at least two modulation periods of at least one primary light are arranged with an interval; according to the sequence of the modulation periods, control the corresponding adjustable light sources to generate the primary light of the corresponding color in each modulation period; and control the light modulator to modulate the primary light of the corresponding color. Thus, when at least two modulation periods of at least one primary light are arranged with an interval, one modulation period of one primary light may be modulated first, then one modulation period of another primary light may be modulated. As compared with the conventional technique in which all the modulation periods of one primary light are modulated first and then all the modulation periods of another primary color light are modulated, the switching speed of the primary light of different colors in the disclosed projection system may be greatly improved, thereby significantly reducing the influence of the rainbow effect on the quality of the projected images.

Second Embodiment

Figure 6:
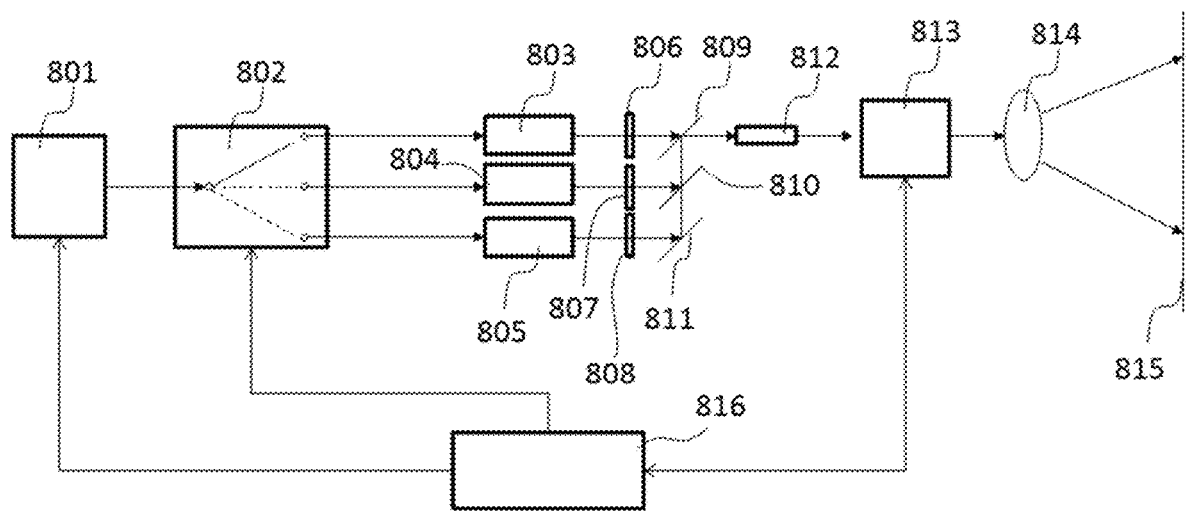
FIG. 6 illustrates a schematic diagram of an exemplary projection system according to a second embodiment.

The disclosed embodiment provides a projection system. Different from the first embodiment, the light source system in the second embodiment shown in FIG. 6 may comprise an excitation light source 801, a light-switching device 802, a first color wheel 805, a second color wheel 804 and a third color wheel 803. The excitation light source 801 may emit excitation light. The light-switching device 802 may switch the propagation path of the excitation light, i.e., switching the excitation light to be incident onto the first color wheel 805, the second color wheel 804 or the third color wheel 803 to generate first primary light, second primary light or third primary light. The first color wheel 805 may comprise a red phosphor and generate the first primary light (i.e., red light R) under the irradiation of the excitation light, the second color wheel 804 may comprise a green phosphor and generate the second primary light (i.e., green light G) under the irradiation of the excitation light, and the third color wheel 803 may comprise a blue phosphor or a scattering powder, and generate the third primary light (i.e., blue light B) under the irradiation of the excitation light. The light modulation system may comprise a light modulator 813. The control system 816 may control the light-switching device 802 to switch the excitation light to be incident onto the corresponding color wheel in accordance with the sequence of the modulation periods, thereby generating the primary light of the corresponding color in each modulation period.

In addition, the projection system may further comprise a first filter 808, a second filter 807, and a third filter 806. The first filter 808 may be provided on the light exit surface of the first color wheel 805 for transmitting the first primary light while blocking the other light. The second filter 807 may be provided on the light exit surface of the second color wheel 804 for transmitting the second primary light while blocking the other light. The third filter 806 may be provided on the light exit surface of the third color wheel 803 for transmitting the third primary light while blocking the other light.

The projection system may further comprise a light-combining system disposed between the color wheel and the light modulator. The light-combining system may comprise a reflective mirror 811, a first dichroic mirror 810, and a second dichroic mirror 809. The reflective mirror 811 may reflect the first primary light to the first dichroic mirror 810. The first dichroic mirror 810 may transmit the first light, and reflect the second primary light to the second dichroic mirror 809. The second dichroic mirror 809 may reflect the first primary light and the second primary light, and transmit the third primary light. The projection system may further comprise a light-uniforming device 812 for homogenizing the first primary light, the second primary light, and the third primary light.

Optionally, when the $(N-1)^{th}$ modulation period of the second primary light G and the $(N-1)^{th}$ modulation period of the third primary light B are sequentially arranged between the $(N-1)^{th}$ modulation period and the $N^{th}$ modulation period of the first primary light R, given the number of the gray scales is four, as shown in FIG. 4, the modulation periods may be sequentially arranged as the $1^{st}$ modulation period R1 of the first primary light (i.e., red light), the $1^{st}$ modulation period G1 of the second primary light (i.e., green light), the $1^{st}$ modulation period B1 of the third primary light (i.e., blue light), the $2^{nd}$ modulation period R2 of the first primary light (i.e., red light) . . . and the $4^{th}$ modulation period B4 of the third primary light (i.e., blue light).

Accordingly, during the $1^{st}$ modulation period R1 of the first primary light, the control system 816 may control the light switching device 802 to switch the excitation light to be incident onto the first color wheel 805, thereby generating the first primary light (i.e., red light); during the $1^{st}$ modulation period G1 of the second primary light, the control system 816 may control the light switching device 802 to switch the excitation light to be incident onto the second color wheel 804, thereby generating the second primary light (i.e., green light); during the $1^{st}$ modulation period B1 of the third primary light, the control system 816 may control the light switching device 802 to switch the excitation light to be incident onto the third color wheel 803, thereby generating the third primary light (i.e., blue light); and so on.

Meanwhile, the control system 816 may control the light modulator 813 to perform the first-gray scale modulation on the red light in the $1^{st}$ modulation period R1 of the red light, control the light modulator 813 to perform the first-gray scale modulation on the green light in the $1^{st}$ modulation period G1 of the green light, control the light modulator 813 to perform the first-gray scale modulation on the blue light in the $1^{st}$ modulation period B1 of the blue light, and so on. After being modulated by the light modulator 813, the red light, the green light and the blue light may be mixed into one light, which is going to be projected by the projection lens 814.

In the disclosed embodiment, the projection system may divide the time duration of each primary light in each source image frame into a plurality of modulation periods according to the number of the gray scales; sequentially arrange the modulation periods, where at least two modulation periods of at least one primary light are arranged with an interval; according to the sequence of the modulation periods, control the corresponding light-switching devices to switch the excitation light to be incident onto the corresponding color wheels in each modulation period, to generate the primary light of the corresponding color; and control the light modulator to modulate the primary light of the corresponding color. Thus, when at least two modulation periods of at least one primary light are arranged with an interval, one modulation period of one primary light may be modulated first, then one modulation period of another primary light may be modulated. As compared with the conventional technique in which all the modulation periods of one primary light are modulated first, and then all the modulation periods of another primary color light are modulated, the switching speed of the primary light of different colors in the disclosed projection system may be greatly improved, thereby significantly reducing the influence of the rainbow effect on the quality of the projected images.

Third Embodiment

Figure 7:
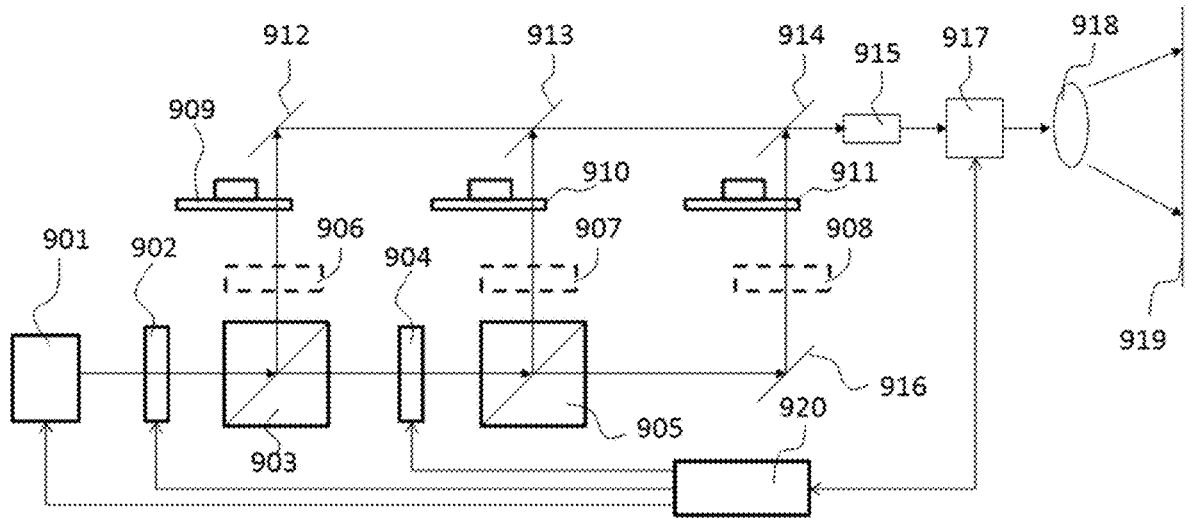
FIG. 7 illustrates a schematic diagram of an exemplary projection system according to a third embodiment.

The disclosed embodiment provides a projection system. Different from the previous embodiments, the light source system in the third embodiment shown in FIG. 7 may comprise an excitation light source 901, a first polarization converter 902, a second polarization converter 904, a first beam splitter 903, a second beam splitter 905, a reflective mirror 916, a first color wheel 909, a second color wheel 910, and a third color wheel 911. The excitation light source 901 may emit excitation light, which is first polarized light. The first polarization converter 902 may convert the first polarized light to the second polarized light or directly transmit the first polarized light. The polarizations of the first and second polarized light may be perpendicular to each other, such as P polarized light and S polarized light. The first beam splitter 903 may transmit the first polarized light, and reflect the second polarized light onto the first color wheel 909 to generate the first primary light. The second polarization converter 904 may covert the first polarized light to the second polarized light or directly transmit the first polarized light. The second beam splitter 905 may transmit the first polarized light, and reflect the second polarized light onto the second color wheel 910 to generate the second primary light. The reflective mirror 916 may reflect the first polarized light onto the third color wheel 911 to generate the third primary light. The control system 920, according to the sequence of the modulation periods, may control the corresponding polarization converter to convert or transmit the light incident thereon, thereby generating the primary light of the corresponding color in each modulation period.

The projection system may further comprise a first polarization analyzer 906, a second polarization analyzer 907 and a third polarization analyzer 908. The first polarization analyzer 906 may be disposed between the first beam splitter 903 and the first color wheel 909, for transmitting the second polarized light while blocking other light. The second polarization analyzer 907 may be disposed between the second beam splitter 905 and the second color wheel 910, for transmitting the second polarized light while blocking other light. The third polarization analyzer 908 may be disposed between the reflective mirror 916 and the third color wheel 911, for transmitting the first polarized light while blocking other light.

The projection system may further comprise a light-combining system disposed between the color wheel and the light modulator. The light-combining system may comprise a reflective mirror 912, a first dichroic mirror 913, and a second dichroic mirror 914. The reflective mirror 912 may reflect the first primary light to the first dichroic mirror 913. The first dichroic mirror 913 may transmit the first light, and reflect the second primary light to the second dichroic mirror 914. The second dichroic mirror 914 may transmit the first primary light and the second primary light, and reflect the third primary light. The projection system may further comprise a light-uniforming device 915 for homogenizing the first primary light, the second primary light, and the third primary light.

In the disclosed embodiment, the excitation light source 901 may be a semiconductor laser or a light-emitting diode emitting blue light, the first color wheel 909 may be a color wheel having a red phosphor, the second color wheel 910 may be a color wheel having a green phosphor, and the third color wheel 911 may be a color wheel having a blue phosphor or a scattering wheel. That is, the first primary light may be red light R, the second primary light may be green light G, and the third primary light may be blue light B.

Optionally, when the $(N-1)^{th}$ modulation period of the second primary light G and the $(N-1)^{th}$ modulation period of the third primary light B are sequentially arranged between the $(N-1)^{th}$ modulation period and the $N^{th}$ modulation period of the first primary light R, given the number of the gray scales is four, as shown in FIG. 4, the modulation periods may be sequentially arranged as the $1^{st}$ modulation period R1 of the first primary light (i.e., red light), the $1^{st}$ modulation period G1 of the second primary light (i.e., green light), the $1^{st}$ modulation period B1 of the third primary light (i.e., blue light), the $2^{nd}$ modulation period R2 of the first primary light (i.e., red light) . . . and the $4^{th}$ modulation period B4 of the third primary light (i.e., blue light).

Accordingly, during the $1^{st}$ modulation period R1 of the first primary light, the control system 920 may control the first polarization converter 902 to convert the first polarized light to the second polarized light, then the first beam splitter 903 may reflect the second polarized light onto the first color wheel 909 to generate the first primary light (i.e., red light); during the $1^{st}$ modulation period G1 of the second primary light, the control system 920 may control the first polarization converter 902 to directly transmit the first polarized light, then the first beam splitter 903 may transmit the first polarized light, then the control system 920 may control the second polarization converter 904 to convert the first polarized light to the second polarized light, then the second beam splitter 905 may reflect the second polarized light onto the second color wheel 910 to generate the second primary light (i.e., green light); during the $1^{st}$ modulation period B1 of the third primary light, the control system 920 may control the first polarization converter 902 to directly transmit the first polarized light, then the first beam splitter 903 may transmit the first polarized light, then the control system 920 may control the second polarization converter 904 to directly transmit the first polarized light, then the second beam splitter 905 may transmit the first polarized light, then the reflective mirror 916 may reflect the first polarized light onto the third color wheel 911 to generate the third primary light (i.e., blue light); and so on.

Meanwhile, the control system 920 may control the light modulator 917 to perform the first-gray scale modulation on the red light in the $1^{st}$ modulation period R1 of the red light, control the light modulator 917 to perform the first-gray scale modulation on the green light in the $1^{st}$ modulation period G1 of the green light, control the light modulator 917 to perform the first-gray scale modulation on the blue light in the $1^{st}$ modulation period B1 of the blue light, and so on. After being modulated by the light modulator 917, the red light, the green light and the blue light may be mixed into one light, which is going to be projected by the projection lens 918.

In the disclosed embodiment, the projection system may divide the time duration of each primary light in each source image frame into a plurality of modulation periods according to the number of the gray scales; sequentially arrange the modulation periods, where at least two modulation periods of at least one primary light are arranged with an interval; according to the sequence of the modulation periods, control the polarization converts to convert or directly transmit the light incident thereon in each modulation period, such that the beam splitters may reflect the corresponding polarized light to the corresponding color wheel to generate the primary light of the corresponding color; and control the light modulator to modulate the primary light of the corresponding color. Thus, when at least two modulation periods of at least one primary light are arranged with an interval, one modulation period of one primary light may be modulated first, and then one modulation period of another primary light may be modulated. As compared with the conventional technique in which all the modulation periods of one primary light are modulated first, and then all the modulation periods of another primary color light are modulated, the switching speed of the primary light of different colors in the disclosed projection system may be greatly improved, thereby significantly reducing the influence of the rainbow effect on the quality of the projected images.

Fourth Embodiment

Figure 8:
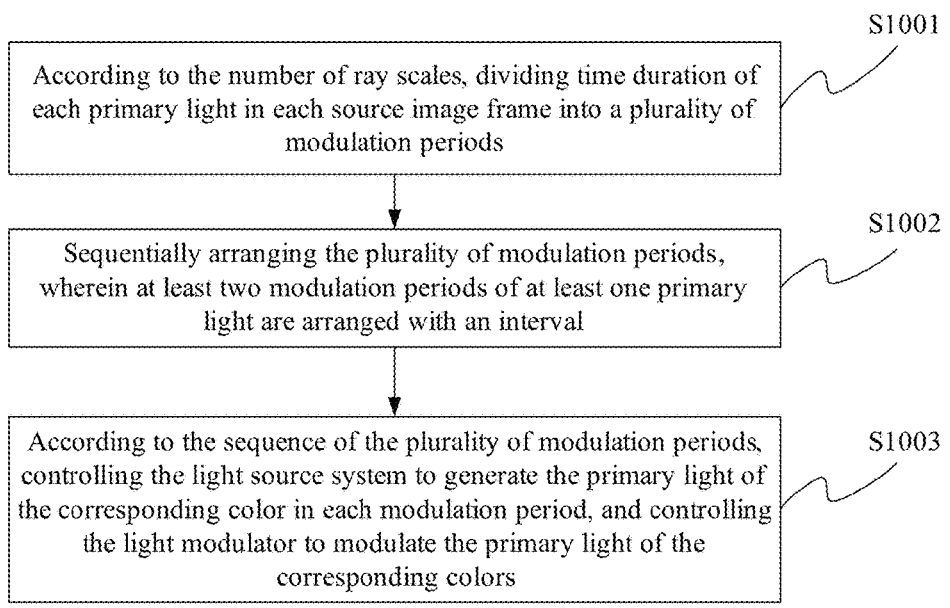
FIG. 8 illustrates a flow chart of an exemplary projection system control method according to a fourth embodiment.

The disclosed embodiment provides a projection system control method, which may be applied to any one of the disclosed projection systems. As shown in FIG. 8, the control method may comprise the following steps.

S1001: according to the number of gray scales, dividing the time duration of each primary light in each source image frame into a plurality of modulation periods.

For example, when the number of gray scales is four, the time duration of each primary light in each source image frame may be divided into four modulation periods. That is, the time duration of the first primary light (e.g., red light) may be divided into four modulation periods R1, R2, R3, and R4, the time duration of the second primary light (e.g., green light) may be divided into four modulation periods G1, G2, G3 and G4, and R4, and the time duration of the third primary light (e.g., blue light) may be divided into four modulation periods B1, B2, B3 and B4.

S1002: sequentially arranging the plurality of modulation periods, wherein at least two modulation periods of at least one primary light are arranged with an interval.

When the primary light of three colors includes first, second and third primary light, arranging at least two modulation periods of at least one primary light with an interval may include: arranging any one of the modulation periods of the second primary light and any one of the modulation periods of the third primary light between any two modulation periods of the first primary light, where the any one of the modulation periods of the second primary light and the any one of the modulation periods of the third primary light may be sequentially arranged.

When each of the first primary light, the second primary light, and the third primary light includes the $1^{st}$ modulation period to the $N^{th}$ modulation period, arranging at least one of any one of the modulation periods of the second primary light and any one of the modulation periods of the third primary light between any two modulation periods of the first primary light may comprise: sequentially arranging the $1^{st}$ modulation period of the second primary light and the $1^{st}$ modulation period of the third primary light between the $1^{st}$ modulation period and the $2^{nd}$ modulation period of the first primary light; sequentially arranging the $2^{nd}$ modulation period of the second primary light and the $2^{nd}$ modulation period of the third primary light between the $2^{nd}$ modulation period and the $3^{rd}$ modulation period of the first primary light, and so on; and sequentially arranging the $(N-1)^{th}$ modulation period of the second primary light and the $(N-1)^{th}$ modulation period of the third primary light between the $(N-1)^{th}$ modulation period and the $N^{th}$ modulation period of the first primary light, where N is a natural number greater than 1.

S1003: according to the sequence of the plurality of modulation periods, controlling the light source system to generate the primary light of the corresponding color in each modulation period, and controlling the light modulator to modulate the primary light of the corresponding color.

When the light source system comprises a first adjustable light source, a second adjustable light source and a third adjustable light source, according to the sequence of the plurality of modulation periods, controlling the light source system to generate the primary light of the corresponding color in each modulation period may comprise: according to the sequence of the plurality of modulation periods, controlling the corresponding adjustable light source to be turned on and the other adjustable light sources to be turned off, thereby generating the primary light of the corresponding color in each modulation period.

When the light source system includes an excitation light source, a light-switching device, a first color wheel, a second color wheel and a third color wheel, according to the sequence of the plurality of modulation periods, controlling the light source system to generate the primary light of the corresponding color in each modulation period may comprise: according to the sequence of the plurality of modulation periods, controlling the light-switching device to switch the excitation light to be incident onto the corresponding color wheel, thereby generating the primary light of the corresponding color in each modulation period.

When the light source system includes an excitation light source, a first polarization converter, a second polarization converter, a first beam splitter, a second beam splitter, a reflective mirror, a first color wheel, a second color wheel and a third color wheel, controlling the light source system to generate the primary light of the corresponding color in each modulation period may comprise: according to the sequence of the plurality of modulation periods, controlling the corresponding polarization converter to convert or transmit the light incident onto the polarization converter, thereby generating the primary light of the corresponding color in each modulation period.

In the disclosed embodiment, the projection system and the control method thereof may divide the time duration of each primary light in each source image frame into a plurality of modulation periods according to the number of the gray scales; sequentially arrange the modulation periods, where at least two modulation periods of at least one primary light are arranged with an interval; according to the sequence of the modulation periods, control the light source system to generate the primary light of the corresponding color in each modulation period; and control the light modulator to modulate the primary light of the corresponding color. Thus, when at least two modulation periods of at least one primary light are arranged with an interval, one modulation period of one primary light may be modulated first, and then one modulation period of another primary light may be modulated. As compared with the conventional technique in which all the modulation periods of one primary light are modulated first, and then all the modulation periods of another primary color light are modulated, the switching speed of the primary light of different colors in the disclosed projection system may be greatly improved, thereby significantly reducing the influence of the rainbow effect on the quality of the projected images.

Various embodiments of the present specification are described in a progressive manner, in which each embodiment focusing on aspects different from other embodiments, and the same and similar parts of each embodiment may be referred to each other. Since the disclosed electronic device corresponds to the disclosed control method, the description of the disclosed electronic device is relatively simple, and the correlation may be referred to the method section.

The present disclosure may be implemented and used according to above description of embodiments of the present disclosure by the skilled person in the art. It is apparent that various modifications of the embodiments may be made by the person skilled in the art. The general principle defined herein may be applicable in other embodiments without departing from the spirit and scope of the present disclosure. Therefore, the present disclosure will not be limited to the embodiments of the present disclosure and confirms to a widest scope in accordance with the disclosed principle and the novelty features of the present disclosure.

What is claimed is:

1. A projection system, comprising:
 a light source system, configured to sequentially generate primary light of three colors, primary light of each color having an illumination time duration;
 a light modulation system comprising at least one light modulator configured to module the primary light; and
 a control system, configured to:
   divide the illumination time duration of each primary light in each source image frame into a plurality of modulation periods according to the number of gray scales of the corresponding primary light,
   sequentially arrange the modulation periods, wherein at least two modulation periods of at least one primary light are arranged with an interval, and at least a modulation period of another primary light is arranged in the interval, and
   control the light source system to generate the primary light of the corresponding color in each modulation period according to a sequence of the modulation periods, and control the at least one light modulator to sequentially modulate the primary light of the corresponding color according to the sequence of the modulation periods, wherein:

when the primary light of three colors includes first, second and third primary light, the control system is further configured to sequentially arrange the modulation periods, wherein:
  at least one of any one of the modulation periods of the second primary light and any one of the modulation periods of the third primary light is arranged between any two modulation periods of the first primary light, and
  the any one of the modulation periods of the second primary light and the any one of the modulation periods of the third primary light are sequentially arranged, when each of the first primary light, the second primary light, and the third primary light includes the $1^{st}$ modulation period to the $N^{th}$ modulation period, the control system is further configured to sequentially arrange the modulation periods, wherein:
  the $1^{st}$ modulation period of the second primary light and the $1^{st}$ modulation period of the third primary light are sequentially arranged between the $1^{st}$ modulation period and the $2^{nd}$ modulation period of the first primary light,
  the $2^{nd}$ modulation period of the second primary light and the $2^{nd}$ modulation period of the third primary light are sequentially arranged between the $2^{nd}$ modulation period and the $3^{rd}$ modulation period of the first primary light, and so on, and
  the $(N-1)^{th}$ modulation period of the second primary light and the $(N-1)^{th}$ modulation period of the third primary light are sequentially arranged between the $(N-1)^{th}$ modulation period and the $N^{th}$ modulation period of the first primary light, where N is a natural number greater than 1, the light source system comprises an excitation light source, a light-switching device, a first color wheel, a second color wheel and a third color wheel, wherein:
  the excitation light source emits excitation light,
  the light-switching device switches the excitation light to be incident onto the first color wheel, the second color wheel or the third color wheel to generate a first primary light, a second primary light or a third primary light, and
  the control system is further configured to control the light-switching device to switch the excitation light to be incident onto the corresponding color wheel according to the sequence of the modulation periods, thereby generating the primary light of the corresponding color in each modulation period, the projection system, further comprising: a first filter, a second filter, and a third filter, wherein:
  the first filter is disposed on a light exit surface of the first color wheel for transmitting the first primary light while blocking other light,
  the second filter is disposed on a light exit surface of the second color wheel for transmitting the second primary light while blocking other light, and
  the third filter is disposed on a light exit surface of the third color wheel for transmitting the third primary light while blocking other light, a light-combining system disposed between the color wheels and the light modulator, wherein:
  the light-combining system comprises a reflective mirror, a first dichroic mirror, and a second dichroic mirror,
  the reflective mirror reflects the first primary light to the first dichroic mirror,
  the first dichroic mirror transmits the first light, and reflects the second primary light to the second dichroic mirror, and
  the second dichroic mirror reflects the first primary light and the second primary light and transmits the third primary light, or transmits the first primary light and the second primary light and reflects the third primary light.

2. A projection system, comprising:
a light source system, configured to sequentially generate primary light of three colors, primary light of each color having an illumination time duration;
a light modulation system comprising at least one light modulator configured to module the primary light; and
a control system, configured to:
  divide the illumination time duration of each primary light in each source image frame into a plurality of modulation periods according to the number of gray scales,
  sequentially arrange the modulation periods, wherein at least two modulation periods of at least one primary light are arranged with an interval, and
control the light source system to generate the primary light of the corresponding color in each modulation period according to a sequence of the modulation periods, and control the at least one light modulator to modulate the primary light of the corresponding color, wherein:
when the primary light of three colors includes first, second and third primary light, the control system is further configured to
  sequentially arrange the modulation periods, wherein:
    at least one of any one of the modulation periods of the second primary light and any one of the modulation periods of the third primary light is arranged between any two modulation periods of the first primary light, and
    the any one of the modulation periods of the second primary light and the any one of the modulation periods of the third primary light are sequentially arranged,
when each of the first primary light, the second primary light, and the third primary light includes the $1^{st}$ modulation period to the $N^{th}$ modulation period, the control system is further configured to
  sequentially arrange the modulation periods, wherein:
    the $1^{st}$ modulation period of the second primary light and the $1^{st}$ modulation period of the third primary light are sequentially arranged between the $1^{st}$ modulation period and the $2^{nd}$ modulation period of the first primary light,
    the $2^{nd}$ modulation period of the second primary light and the $2^{nd}$ modulation period of the third primary light are sequentially arranged between the $2^{nd}$ modulation period and the $3^{rd}$ modulation period of the first primary light, and so on, and
    the $(N-1)^{th}$ modulation period of the second primary light and the $(N-1)^{th}$ modulation period of the third primary light are sequentially arranged between the $(N-1)^{th}$ modulation period and the $N^{th}$ modulation period of the first primary light, where N is a natural number greater than 1, wherein:

the light source system comprises an excitation light source, a first polarization converter, a second polarization converter, a first beam splitter, a second beam splitter, a reflective mirror, a first color wheel, a second color wheel and a third color wheel, wherein the excitation light source emits excitation light, which is first polarized light, the first polarization converter converts the first polarized light to second polarized light or directly transmits the first polarized light, wherein polarization directions of the first and second polarized light are perpendicular to each other, the first beam splitter transmits the first polarized light, and reflects the second polarized light onto the first color wheel to generate the first primary light, the second polarization converter coverts the first polarized light to the second polarized light or directly transmits the first polarized light, the second beam splitter transmits the first polarized light, and reflects the second polarized light onto the second color wheel to generate the second primary light, the reflective mirror reflects the first polarized light onto the third color wheel to generate the third primary light, according to the sequence of the modulation periods, the control system is further configured to control the corresponding polarization converter to convert or transmit, thereby generating the primary light of the corresponding color in each modulation period;

a first analyzer, a second analyzer and a third analyzer,
wherein the first analyzer is disposed between the first beam splitter and the first color wheel, for transmitting the second polarized light while blocking other light, the second analyzer is disposed between the second beam splitter and the second color wheel, for transmitting the second polarized light while blocking other light, and the third analyzer is disposed between the reflective mirror and the third color wheel, for transmitting the first polarized light while blocking other light.

3. The projection system according to claim 1, wherein:
the first color wheel comprises a red phosphor;
the second color wheel comprises a green phosphor; and
the third color wheel comprises a blue phosphor or a scattering powder.

4. The projection system according to claim 2, further including:

a light-combining system disposed between the color wheel and the light modulator, wherein the light-combining system comprises a reflective mirror, a first dichroic mirror, and a second dichroic mirror, the reflective mirror reflects the first primary light to the first dichroic mirror, the first dichroic mirror transmits the first light, and reflects the second primary light to the second dichroic mirror, and the second dichroic mirror reflects the first primary light and the second primary light and transmits the third primary light, or transmits the first primary light and the second primary light and reflects the third primary light.

* * * * *